United States Patent
Fomin et al.

(10) Patent No.: US 11,093,170 B2
(45) Date of Patent: Aug. 17, 2021

(54) DATASET SPLITTING BASED ON WORKLOAD FOOTPRINT ANALYSIS

(71) Applicant: EMC IP Holding Company LLC, Hopkinton, MA (US)

(72) Inventors: Alexey Fomin, Saint Petersburg (RU); Yuri Zagrebin, Saint Petersburg (RU); Nickolay Dalmatov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 66 days.

(21) Appl. No.: 16/372,929

(22) Filed: Apr. 2, 2019

(65) Prior Publication Data
US 2020/0319820 A1    Oct. 8, 2020

(51) Int. Cl.
*G06F 12/00* (2006.01)
*G06F 13/00* (2006.01)
*G06F 3/06* (2006.01)
*G06N 20/00* (2019.01)

(52) U.S. Cl.
CPC .......... *G06F 3/0659* (2013.01); *G06F 3/0604* (2013.01); *G06F 3/0653* (2013.01); *G06F 3/0673* (2013.01); *G06N 20/00* (2019.01)

(58) Field of Classification Search
CPC .... G06F 3/0659; G06F 3/0604; G06F 3/0653; G06F 3/0673; G06N 20/00
USPC ....................................................... 711/154
See application file for complete search history.

(56) References Cited

U.S. PATENT DOCUMENTS

| | | | | |
|---|---|---|---|---|
| 9,372,637 | B1* | 6/2016 | Alatorre | G06F 3/067 |
| 9,830,256 | B1* | 11/2017 | Olson | G06F 3/0653 |
| 10,565,501 | B1* | 2/2020 | Olson | G06F 3/0605 |
| 2002/0095532 | A1* | 7/2002 | Surugucchi | G06F 3/0632 710/5 |
| 2005/0005066 | A1* | 1/2005 | Nakayama | G06F 3/067 711/117 |
| 2005/0055523 | A1* | 3/2005 | Suishu | G06F 11/2064 711/165 |
| 2005/0273565 | A1* | 12/2005 | Hirakawa | G06F 11/2069 711/162 |
| 2006/0085609 | A1* | 4/2006 | Ninose | G06F 11/2082 711/162 |
| 2006/0117154 | A1* | 6/2006 | Suishu | G06F 11/2082 711/162 |
| 2006/0174156 | A1* | 8/2006 | Balasubramanian | G06F 12/0897 714/6.12 |
| 2007/0022142 | A1* | 1/2007 | Palmer | G06Q 10/06 |
| 2007/0220371 | A1* | 9/2007 | Duyanovich | G06F 11/3447 714/49 |

(Continued)

*Primary Examiner* — Sheng Jen Tsai
(74) *Attorney, Agent, or Firm* — Amin, Turocy & Watson, LLP

(57) ABSTRACT

Techniques are provided for splitting a computer dataset between multiple storage locations based on a workload footprint analysis of that dataset. As a computer accesses data storage, its input/output (I/O) access can be monitored, as well as a working dataset of that dataset. The I/O access patterns can be used to determine an application of the computer that is generating the I/O. The application and the working dataset can be used to determine a split for the dataset across multiple storage locations. The dataset can then be split according to the determined split.

20 Claims, 11 Drawing Sheets

(56) References Cited

U.S. PATENT DOCUMENTS

| | | | | |
|---|---|---|---|---|
| 2007/0254922 | A1* | 11/2007 | Hiraiwa | G06F 11/2071 514/338 |
| 2008/0109589 | A1* | 5/2008 | Honda | G06F 3/064 711/103 |
| 2009/0216986 | A1* | 8/2009 | Sakurai | G06F 3/067 711/170 |
| 2011/0078395 | A1* | 3/2011 | Okada | G06F 3/065 711/162 |
| 2012/0047287 | A1* | 2/2012 | Chiu | G06F 3/0647 710/8 |
| 2012/0079097 | A1* | 3/2012 | Gopisetty | G06F 9/5083 709/224 |
| 2012/0079172 | A1* | 3/2012 | Yoshida | G06F 12/0607 711/103 |
| 2012/0254640 | A1* | 10/2012 | Agarwala | G06F 3/0625 713/320 |
| 2012/0278511 | A1* | 11/2012 | Alatorre | G06F 3/0605 710/33 |
| 2012/0278512 | A1* | 11/2012 | Alatorre | G06F 3/0604 710/33 |
| 2013/0081015 | A1* | 3/2013 | Noma | G06F 9/45558 718/1 |
| 2013/0086324 | A1* | 4/2013 | Soundararajan | G06F 12/0811 711/122 |
| 2013/0166724 | A1* | 6/2013 | Bairavasundaram | G06F 9/5016 709/224 |
| 2013/0198449 | A1* | 8/2013 | Belluomini | G06F 3/0644 711/114 |
| 2013/0275391 | A1* | 10/2013 | Batwara | G06F 16/125 707/689 |
| 2014/0156877 | A1* | 6/2014 | Tylik | G06F 3/0653 710/18 |
| 2015/0142942 | A1* | 5/2015 | Voruganti | G06F 11/1458 709/223 |
| 2015/0347040 | A1* | 12/2015 | Mathur | G06F 3/0679 711/103 |
| 2015/0347266 | A1* | 12/2015 | Sivathanu | G06F 11/348 714/45 |
| 2016/0048448 | A1* | 2/2016 | Kwon | G06F 12/0292 711/103 |
| 2016/0139847 | A1* | 5/2016 | Ueki | G06F 3/061 711/103 |
| 2016/0202933 | A1* | 7/2016 | Alatorre | G06F 3/0604 711/154 |
| 2016/0274792 | A1* | 9/2016 | Ogawa | G06F 3/061 |
| 2017/0206015 | A1* | 7/2017 | Zhuang | G06F 3/067 |
| 2018/0052715 | A1* | 2/2018 | Hayashi | G06F 9/46 |
| 2018/0067780 | A1* | 3/2018 | Noda | H04L 41/5051 |
| 2018/0074724 | A1* | 3/2018 | Tremblay | G06F 3/0611 |
| 2018/0316650 | A1* | 11/2018 | Forde | H04L 12/4633 |
| 2018/0373429 | A1* | 12/2018 | Yamamoto | G06F 3/061 |
| 2019/0065278 | A1* | 2/2019 | Jeuk | G06F 9/45558 |
| 2019/0278632 | A1* | 9/2019 | Sakai | G06F 9/5077 |
| 2020/0042242 | A1* | 2/2020 | Byun | G06F 3/064 |
| 2020/0278793 | A1* | 9/2020 | Jiang | G06F 3/0679 |
| 2020/0311280 | A1* | 10/2020 | Byrne | G06F 21/57 |

* cited by examiner

DATASET SPLITTING BASED ON WORKLOAD FOOTPRINT ANALYSIS

TECHNICAL FIELD

The present application relates generally to techniques for splitting a computer dataset between multiple storage locations based on a workload footprint analysis of that dataset.

BACKGROUND

A computer dataset can be split between multiple computer storage locations (e.g., on premises storage and cloud storage). These different storage locations can have different characteristics, e.g., in terms of cost or performance.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
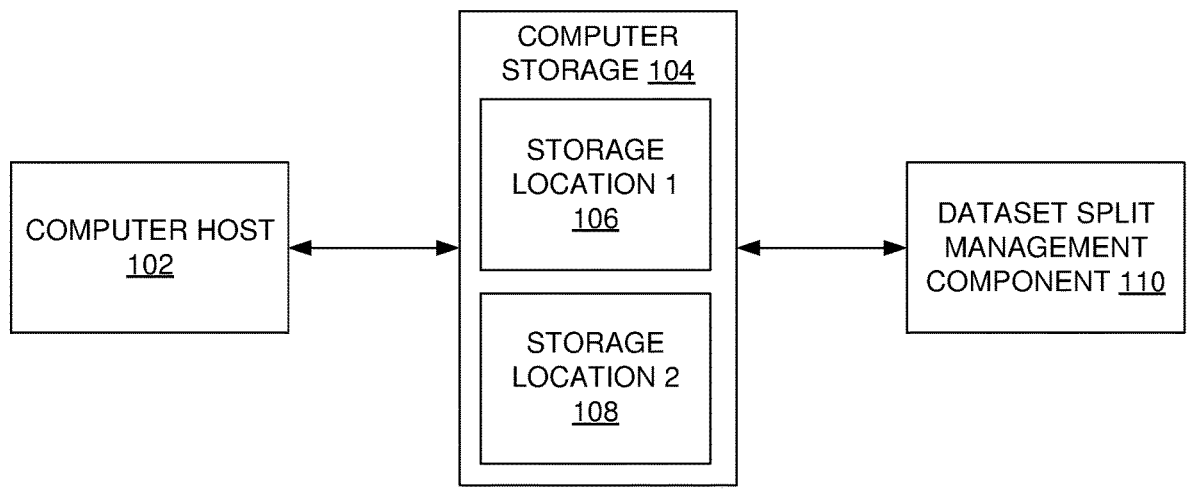
FIG. 1 illustrates a block diagram of an example computer system that can facilitate splitting a computer dataset between multiple storage locations based on a workload footprint analysis of that dataset, in accordance with certain embodiments of this disclosure.

Different applications can access storage objects (e.g., logical unit numbers (LUNs), file systems, etc.) differently. The corresponding I/O patterns of these different accesses by different applications can be different, e.g., in terms of block size, read/write split, random access/sequential access split, etc.

Additionally, each application can have its own workload footprint, which can represent what part of a dataset is accessed by the I/O. If a workload footprint is small (compared to the overall dataset), and relatively stable, then the unused or infrequently used part of the dataset (sometimes referred to as a "cold" part of the dataset) can be offloaded to cheaper storage (or cloud storage). This offloading of some data of a dataset can be an example of splitting the dataset.

For example, in a DELL EMC VMAX computer storage system (sometimes referred to as an "array") or a DELL EMC POWERMAX computer storage system, federated tiered storage (FTS) technology can be used to split the dataset. When a workload footprint changes, a computer system can download data that will likely be accessed in the future (which can be referred to as the data becoming "hot") and offload data that will likely become cold.

A problem with data splitting is that a user of a computer system might have no detailed information about the system's workload. As a result, a user might not be able to understand if there is a benefit from data splitting.

There can also be a problem with data splitting for a workload that is not suitable for such splitting. For example, a dataset that has a relatively large workload footprint, or that has a workload footprint that frequently changes might not be suitable for dataset splitting. Splitting a dataset that is unsuitable for such splitting can lead to performance degradation or spikes of latency.

A solution to these problems can involve automatic workload footprint detection, evaluating footprint stability, and creating a recommendation for dataset distribution. In some examples, this recommendation for a split to a dataset can be automatically be applied to the dataset.

As described herein, in an example, a storage array can monitor the I/O access patterns for the different storage objects that it holds. This pattern-related information can include block size, read/write split, and random access/sequential access split.

The storage array can monitor the working set related information, such as by monitoring which regions of logical address space are accessed. For example, in a VMAX computer storage system or a POWERMAX computer storage system, a fully automated storage tiering (FAST) technology can be used to collect this data.

The storage array can aggregate this collected data and send it to a central location, such as a data lake (which can be a single storage of all data for the computer storage system, including both raw data and transformed data, such as a report generated based on the raw data), or a CLOUDIQ data monitoring application, using a Call Home communication link between the computer storage system and the central location.

At the central location, the received data can be processed. The I/O patterns can be used to detect the application generating the I/O. Then, information can be maintained about workload footprints and a stability of a footprint for particular applications. Additionally, the working set related information can be used to identify the workload footprint, and how it can change over time.

Once the workload footprint is identified, the system can evaluate whether dataset splitting between two storage locations (e.g., two arrays, or an array and cloud storage) is appropriate.

Where the system determines that a particular dataset split (or lack thereof) is misconfigured, the system can perform one or more corrective actions. The system can notify a user that he or she can benefit from dataset splitting, or that the current split is suboptimal as it can degrade the performance of this particular workload. The system can provide a recommended configuration change to the user. The system can apply the recommended configuration change automatically.

Another problem exists where the characteristics of the workload footprint are not static—i.e., the workload footprint changes over time. A workload can have different periods in its life cycle. These periods can be of activity or inactivity.

An example involves a state tax agency database, which can be accessed intensively during a short period of time when taxes are collected. During this activity period, the workload can have an intensive I/O, and a workload footprint equal to the size of the dataset. During a period of inactivity, the I/O and the workload footprint can be small.

Furthermore, activity periods can have different sub-periods. For example, data can be ingested first, and then processed second. Workload footprints and I/O access patterns for these sub-periods can be different.

Where a workload footprint is small and relatively stable, then the cold part of the dataset can be offloaded to a cheaper (or slower, etc.) storage type. For example, in a VMAX computer storage system or a POWERMAX computer storage system, FTS can be used to split the dataset. When a workset footprint is being changed, the computer storage system can offload the data that is becoming cold and download the data that is becoming hot. Depending on the type of anticipated I/O accesses, different media can be determined to be used for storing the data that is becoming hot. For example, a computer storage system can utilize low-endurance solid state drives (SSDs) for read-intensive data, and higher-endurance SSDs for write-intensive data.

A solution that addresses a workload footprint changing over time can be as follows. A computer storage system can monitor the I/O access patterns for the storage objects that it holds. Information about these I/O access patterns can include block size, read/write split, and random/sequential split.

The storage system can monitor the working set related information, such as by monitoring which regions of logical address space are accessed. For example, in a VMAX computer storage system or a POWERMAX computer storage system, a FAST technology can be used to collect this data.

The storage array can aggregate this collected data and send it to a central location, such as a data lake (which can be a single storage of all data for the computer storage system, including both raw data and transformed data, such as a report generated based on the raw data), or a CLOUDIQ data monitoring application, using a Call Home communication link between the computer storage system and the central location.

At the central location, the received data can be processed. The I/O patterns can be used to detect the application generating the I/O. Then, information can be maintained about workload footprints and a stability of a footprint for particular applications. Additionally, the working set related information can be used to identify the workload footprint, and how it can change over time.

Example Architecture

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example computer system 100 that can facilitate splitting a computer dataset between multiple storage locations based on a workload footprint analysis of that dataset, in accordance with certain embodiments of this disclosure.

Computer system comprises computer host 102, computer storage 104, and dataset split management component 110. In some examples, aspects of computer host 102, computer storage 104, and dataset split management component 110 can each be implemented with aspects of computer 1102 of FIG. 11. In turn, computer storage 104 comprises storage location 1 106 and storage location 2 108.

Computer host 102 can be a computer that communicates with computer storage 104 to access storage resources provided by computer storage 104. In some examples, it is one or more applications of computer host 102 that accesses storage resources provided by computer storage 104. This access can be referred to as I/O, and can have various characteristics, such as a rate of access, a ratio of reads to writes, and a ratio of random accesses to sequential accesses.

Computer storage 104 can be a datacenter, or other data storage, such as a VMAX computer storage system or a POWERMAX computer storage system. As depicted, computer storage 104 can comprise storage location 1 106 and storage location 2 108. There can be examples that utilize more storage locations than depicted here, or storage locations that are not within computer storage 104 (such as cloud storage that is accessible via a communications network).

Storage location 1 106 and storage location 2 108 can be differentiated according to some parameter, such as latency for access by computer host 102, cost, or durability (where a lower-durability storage can be used to store data that is primarily read, while a higher-durability storage can be used to store data that it primarily written).

Together, storage location 1 106 and storage location 2 108 store a dataset that is accessed by computer host 102. Where a portion of the dataset is accessed, or accessed within a time period, that portion of the dataset can be considered to be the working dataset.

Computer storage 104 can send information regarding data access to dataset split management component 110. This information can include information about the dataset and information about the characteristics of the I/O (e.g., as a rate of access, a ratio of reads to writes, a ratio of random accesses to sequential accesses, etc.). Dataset split management component 110 can take this information and determine an application utilized by computer host 102 in accessing the dataset, and the working dataset. Based on the application and the working dataset, dataset split management component 110 can determine a split for the data between storage location 1 106 and storage location 2 108. In some examples, dataset split management component 110 can then implement the split by moving data between storage location 1 106 and storage location 2 108.

Dataset split management component 110 can implement aspects of the process flows of FIGS. 3-10 in the course of determining a split for a dataset.

Figure 2:
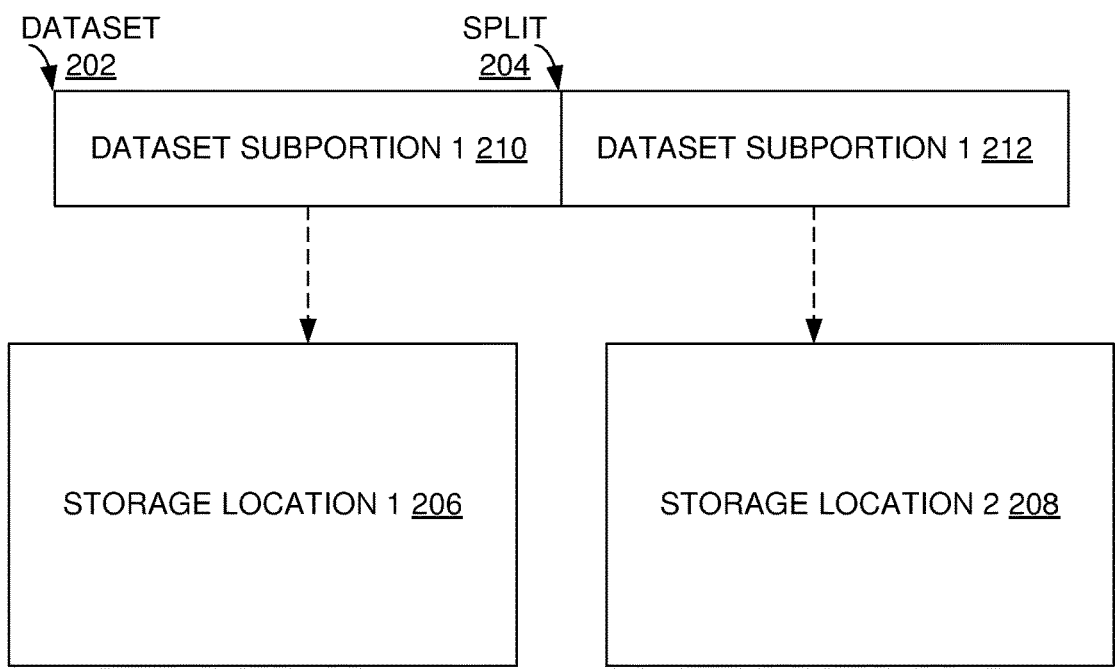
FIG. 2 illustrates an example split of a dataset, in accordance with certain embodiments of this disclosure.

FIG. 2 illustrates an example split 200 of a dataset, in accordance with certain embodiments of this disclosure. In some examples, the split 200 can be implemented between storage location 1 106 of FIG. 1 and storage location 2 108, as determined by data split management component 110.

Split 200 comprises dataset 202, which in turn comprises dataset subportion 1 210 and dataset subportion 2 212. The separation of dataset 202 into dataset subportion 1 210 and dataset subportion 2 212 can be identified as being a split 204. There can be examples where dataset 202 is split into more than two subportions.

Dataset subportion 1 210 is stored in storage location 1 206 (which can be similar to storage location 1 106 of FIG. 1). Dataset subportion 2 212 is stored in storage location 2 208 (which can be similar to storage location 1 108 of FIG. 1). By storing the data of dataset 202 across multiple storage locations (dataset subportion 1 210 in storage location 1 206, and dataset subportion 2 212 in storage location 2 208), a split of dataset 202 according to split 204 is effectuated.

Example Process Flows

Figure 3:
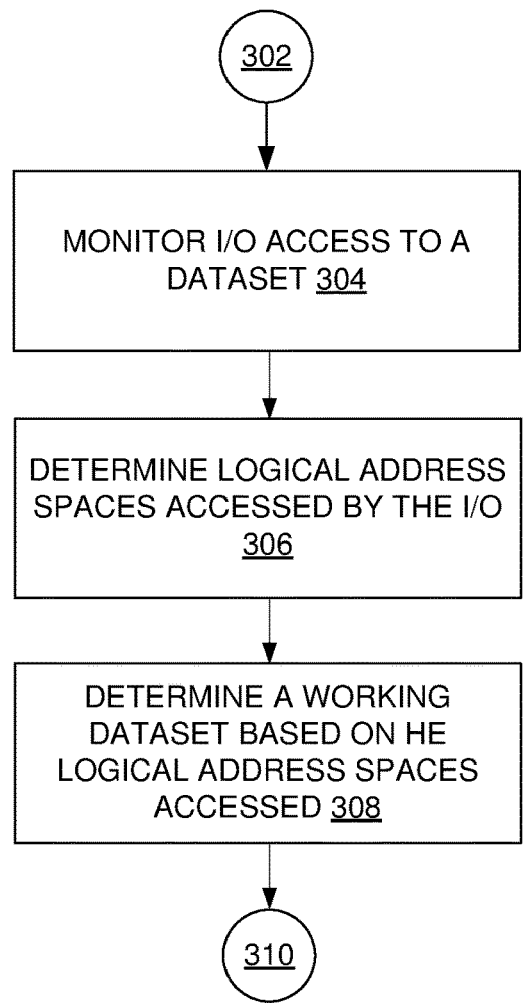
FIG. 3 illustrates an example process flow for determining a working dataset, in accordance with certain embodiments of this disclosure.

FIG. 3 illustrates an example process flow 300 for determining a working dataset, in accordance with certain embodiments of this disclosure.

It can be appreciated that process flow 300 is an example process flow, and that there can be embodiments that implement more or fewer operations than are depicted in process flow 300, or that implement the operations of process flow 300 in a different order than is depicted in process flow 300.

In some embodiments, aspects of process flow 300 can be implemented with computer storage 104 and/or dataset split management component 110 of FIG. 1. Process flow 300 begins with 302, and then moves to operation 304.

Operation 304 depicts monitoring I/O access to a dataset. This I/O access can be from computer host 102 to a dataset stored by computer storage 104, and can be monitored by computer storage 104. After operation 304, process flow 300 moves to operation 306.

Operation 306 depicts determining logical address spaces accessed by the I/O. Computer storage 104 can present all or a portion of its storage resources to computer host 102 with a logical address space that abstracts away where the data is actually stored. For example, computer host 102 can be presented with a single, contiguous logical address space for the dataset, while the dataset is actually stored in multiple discrete locations across multiple disks.

As computer host 102 accesses data of the dataset, computer host 102 can refer to various logical addresses of the dataset, and these referenced logical addresses can be monitored and stored by computer storage 104. After operation 306, process flow 300 moves to operation 308.

Operation 308 depicts determining a working dataset based on the logical address spaces accessed. In some examples, computer storage 104 can determine a working dataset as all logical address spaces accessed by computer host 102. In other examples, computer storage 104 can determine a working dataset as those logical address spaces accessed by computer host 102 that have been accessed within a predefined time period (e.g., accessed within the past hour, or the past month). After operation 308, process flow 300 moves to 310, where process flow 300 ends.

Figure 4:
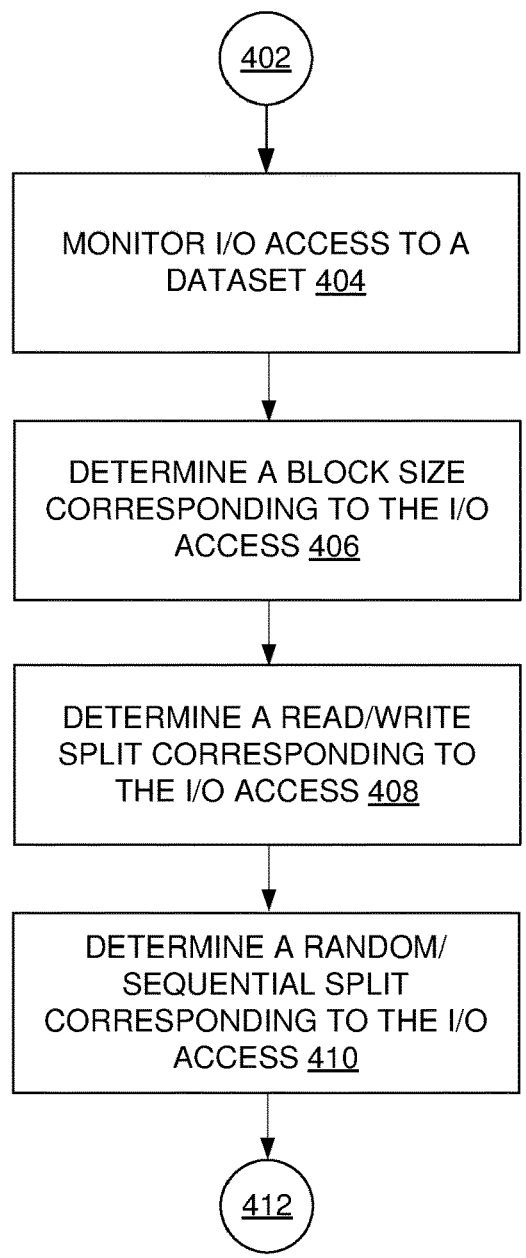
FIG. 4 illustrates an example process flow for determining input/output (I/O) on a dataset, in accordance with certain embodiments of this disclosure.

FIG. 4 illustrates an example process flow 400 for determining I/O on a dataset, in accordance with certain embodiments of this disclosure.

It can be appreciated that process flow 400 is an example process flow, and that there can be embodiments that implement more or fewer operations than are depicted in process flow 400, or that implement the operations of process flow 400 in a different order than is depicted in process flow 400.

In some embodiments, aspects of process flow 400 can be implemented with computer storage 104 and/or dataset split management component 110 of FIG. 1. Process flow 400 begins with 402, and then moves to operation 404.

Operation 404 depicts monitoring I/O access to a dataset. In some examples, operation 404 can be implemented in a similar manner as operation 304 of FIG. 3. After operation 404, process flow 400 moves to operation 406.

Operation 406 depicts determining a block size corresponding to the I/O access. A block size can vary between disks used to store data in computer storage 104, and can be determined by computer storage 104, which can access an application programming interface (API) of the disk to query the disk for the block size the disk is using. After operation 406, process flow 400 moves to operation 408.

Operation 408 depicts determining a read/write split corresponding to the I/O access. In some examples, computer storage 104 can determine an amount of data that is read from computer storage 104 by computer host 102, as well as an amount of data that is written to computer storage 104 by computer host 102, and maintain a metric of each. In some examples, the metric identifies how they are related, such as a ratio of reads to writes. After operation 408, process flow 400 moves to operation 410.

Operation 410 depicts determining a random/sequential split corresponding to the I/O access. A sequential read or write can comprise a read or write or a sequential sequence of logical address space that is referenced by computer host 102. A random read or write can then comprise a read or write that is not classified as sequential. In some examples, a short sequence of otherwise sequential reads or writes below a certain length can be considered to be random reads or writes. After operation 410, process flow 400 moves to 412, where process flow 400 ends.

Figure 5:
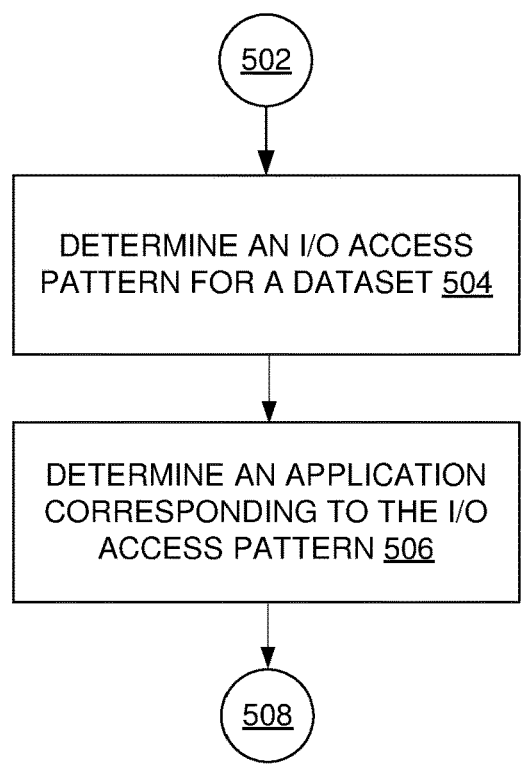
FIG. 5 illustrates an example process flow for determining an application that corresponds to I/O on a dataset, in accordance with certain embodiments of this disclosure.

FIG. 5 illustrates an example process flow 500 for determining an application that corresponds to I/O on a dataset, in accordance with certain embodiments of this disclosure.

It can be appreciated that process flow 500 is an example process flow, and that there can be embodiments that implement more or fewer operations than are depicted in process flow 500, or that implement the operations of process flow 500 in a different order than is depicted in process flow 500.

In some embodiments, aspects of process flow 500 can be implemented with computer storage 104 and/or dataset split management component 110 of FIG. 1. Process flow 500 begins with 502, and then moves to operation 504.

Operation 504 depicts determining an I/O access pattern for a dataset. In some examples, dataset split management component 110 can receive information about the I/O from computer storage 104 that was generated according to process flow 400 of FIG. 4. Dataset split management component 110 can process this information to determine patterns in the I/O access for the dataset. In some examples, machine learning techniques can be implemented to determine the patterns in the I/O access for the dataset. After operation 504, process flow 500 moves to operation 506.

Operation 506 depicts determining an application corresponding to the I/O access pattern. In some examples, dataset split management component 110 maintains stored associations between various I/O access patterns and applications that generate those I/O access patterns. In such examples, in operation 506, dataset split management component 110 compares the I/O access pattern to the stored I/O access patterns.

Where dataset split management component 110 finds a stored I/O access pattern that is sufficiently similar to the I/O access pattern, dataset split management component 110 can determine that the application corresponding to the I/O access pattern is the application corresponding to this sufficiently similar stored I/O access pattern. After operation 506, process flow 500 moves to 508 where process flow 500 ends.

Figure 6:
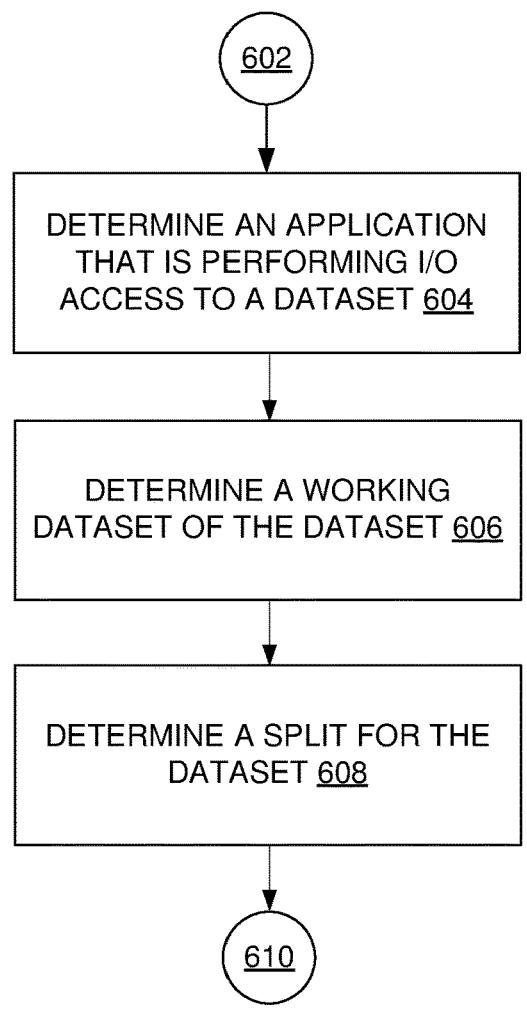
FIG. 6 illustrates an example process flow for determining a split for a dataset, in accordance with certain embodiments of this disclosure.

FIG. 6 illustrates an example process flow 600 for determining a split for a dataset, in accordance with certain embodiments of this disclosure.

It can be appreciated that process flow 600 is an example process flow, and that there can be embodiments that implement more or fewer operations than are depicted in process flow 600, or that implement the operations of process flow 600 in a different order than is depicted in process flow 600.

In some embodiments, aspects of process flow 600 can be implemented with computer storage 104 and/or dataset split management component 110 of FIG. 1. Process flow 600 begins with 602, and then moves to operation 604.

Operation 604 depicts determining an application that is performing I/O access to a dataset. In some examples, operation 604 can be implemented in a similar manner as process flow 500 of FIG. 5. After operation 604, process flow 600 moves to operation 606.

Operation 606 depicts determining a working dataset of the dataset. In some examples, operation 606 can be implemented in a similar manner as operation 308 of FIG. 3. After operation 606, process flow 600 move to operation 608.

Operation 608 depicts determining a split for the dataset. A split can be an arrangement of the dataset across multiple storage locations (e.g., a first portion of the dataset is stored in storage location 1 106 of FIG. 1, and a second portion of the dataset is stored in storage location 2 108 of FIG. 1). Dataset split management component 110 can determine the split based on the application identified in operation 604 and the working dataset determined in operation 606.

In some examples, dataset split management component 110 utilizes other information in determining the split, such as a latency of data access by computer host 102 to various storage locations. After operation 608, process flow 600 moves to 610, where process flow 600 ends.

Figure 7:
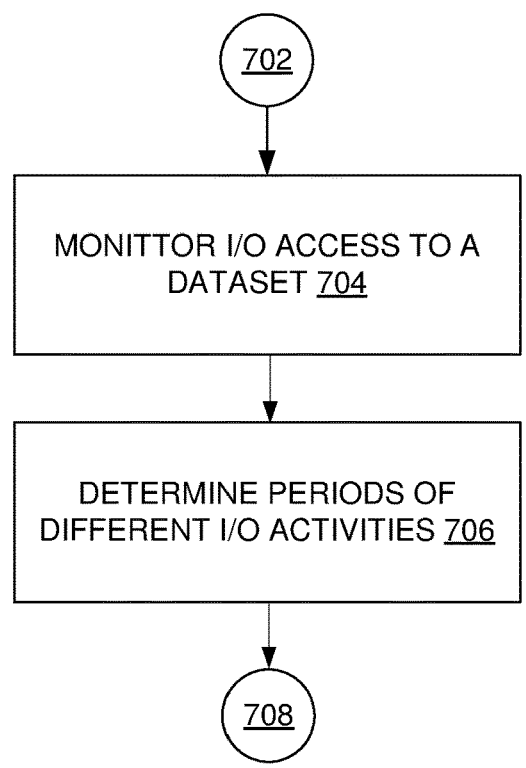
FIG. 7 illustrates an example process flow for determining how a working dataset changes over time, in accordance with certain embodiments of this disclosure.

FIG. 7 illustrates an example process flow 700 for determining how a working dataset changes over time, in accordance with certain embodiments of this disclosure.

It can be appreciated that process flow 700 is an example process flow, and that there can be embodiments that implement more or fewer operations than are depicted in process flow 700, or that implement the operations of process flow 700 in a different order than is depicted in process flow 700.

In some embodiments, aspects of process flow 700 can be implemented with computer storage 104 and/or dataset split management component 110 of FIG. 1. Process flow 700 begins with 702, and then moves to operation 704.

Operation 704 depicts monitoring I/O access to a dataset. In some examples, operation 704 can be implemented in a similar manner as operation 304 of FIG. 3. After operation 704, process flow 700 moves to operation 706.

Operation 706 depicts determining periods of different I/O activities. These different periods can be periods like inactive (or low activity), data ingestion, and data processing, and can have different underlying I/O activities. For example, an inactive period can have little-to-no I/O. A period of data ingestion can have mainly writing I/O, and a period of data processing can have a mainly reading I/O. Dataset split management component 110 can process the monitored I/O to identify these different periods.

In some examples, once these different periods are identified, a split for the dataset can be determined for each period, and the split can be modified over time based on these periods (e.g., usually a first split is implemented which corresponds to a period of inactivity; but near the end of a month, a second split is implemented that corresponds to a period of data ingestion, followed shortly thereafter by a third split that corresponds to a period of data processing, before returning to the first split for most of the next month). After operation 706, process flow 700 moves to 708, where process flow 700 ends.

Figure 8:
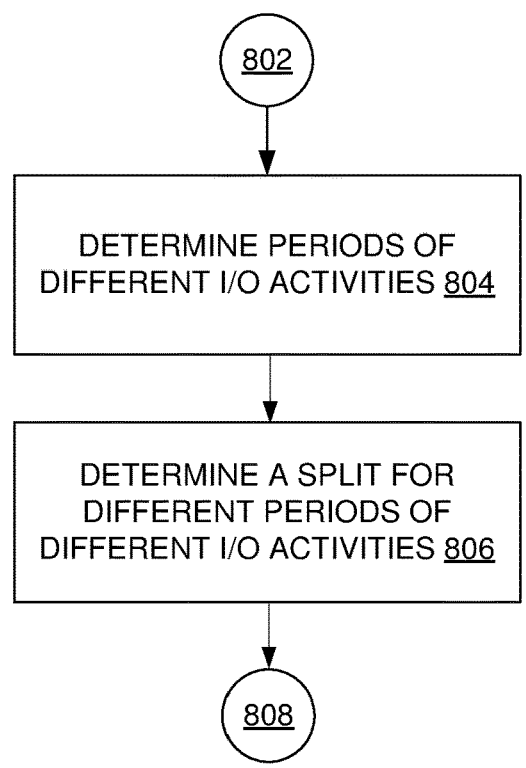
FIG. 8 illustrates an example process flow for determining a split for a dataset that changes over time, in accordance with certain embodiments of this disclosure.

FIG. 8 illustrates an example process flow 800 for determining a split for a dataset that changes over time, in accordance with certain embodiments of this disclosure.

It can be appreciated that process flow 800 is an example process flow, and that there can be embodiments that implement more or fewer operations than are depicted in process flow 800, or that implement the operations of process flow 800 in a different order than is depicted in process flow 800.

In some embodiments, aspects of process flow 800 can be implemented with computer storage 104 and/or dataset split management component 110 of FIG. 1. Process flow 800 begins with 802, and then moves to operation 804.

Operation 804 depicts determining periods of different I/O activities. In some examples, operation 804 can be implemented in a similar manner as operation 706 of FIG. 7. After operation 804, process flow 800 moves to operation 806.

Operation 806 depicts determining a split for different periods of different I/O activities. In some examples, dataset split management component 110 of FIG. 1 can determine a split in a manner similar to as described for operation 608, but for each identified period of different I/O activities. In some examples, an amount of time and/or processing resources to effectuate the split (e.g., an amount of time to copy data of the dataset to storage locations identified by a particular split) can be used to determine the splits. After operation 806, process flow 800 move to 808, where process flow 800 ends.

Figure 9:
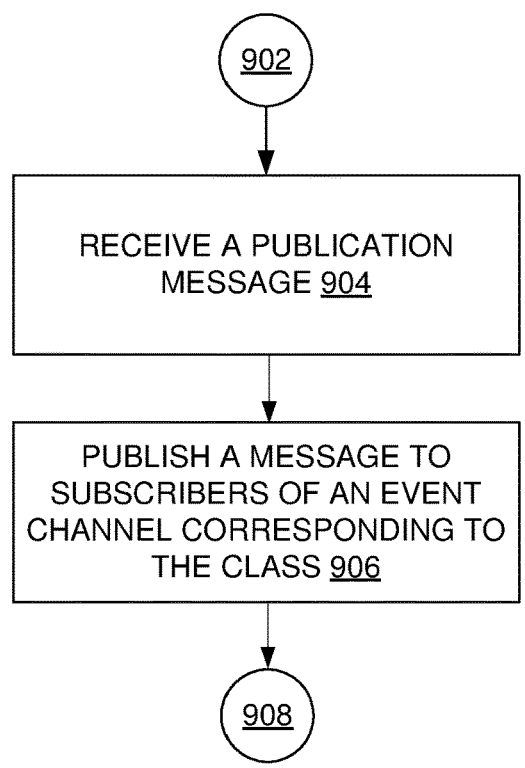
FIG. 9 illustrates an example process flow for responding to a misconfiguration, in accordance with certain embodiments of this disclosure.

FIG. 9 illustrates an example process flow 900 for responding to a misconfiguration, in accordance with certain embodiments of this disclosure.

It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, aspects of process flow 900 can be implemented with computer storage 104 and/or dataset split management component 110 of FIGACT. 1. Process flow 900 begins with 902, and then moves to operation 904.

Operation 904 depicts that there is a misconfiguration for a dataset split. In some examples, a misconfiguration can be a deviation from a split determined operation 608 of FIG. 6 or operation 806 of FIG. 8. After operation 904, process flow 900 moves to operation 906.

Operation 906 depicts implementing a mitigation to the misconfiguration for the dataset split. In some examples, operation 906 comprises notifying a user that he or she can benefit from the dataset being split in a particular way, or that the current split is suboptimal because it degrades performance for a particular workload. In some examples, operation 906 comprises providing a recommended configuration for a split to a user. In some examples, operation 906 comprises implementing the split by transferring data of a dataset between storage locations. After operation 906, process flow 900 moves to 908, where process flow 900 ends.

Figure 10:
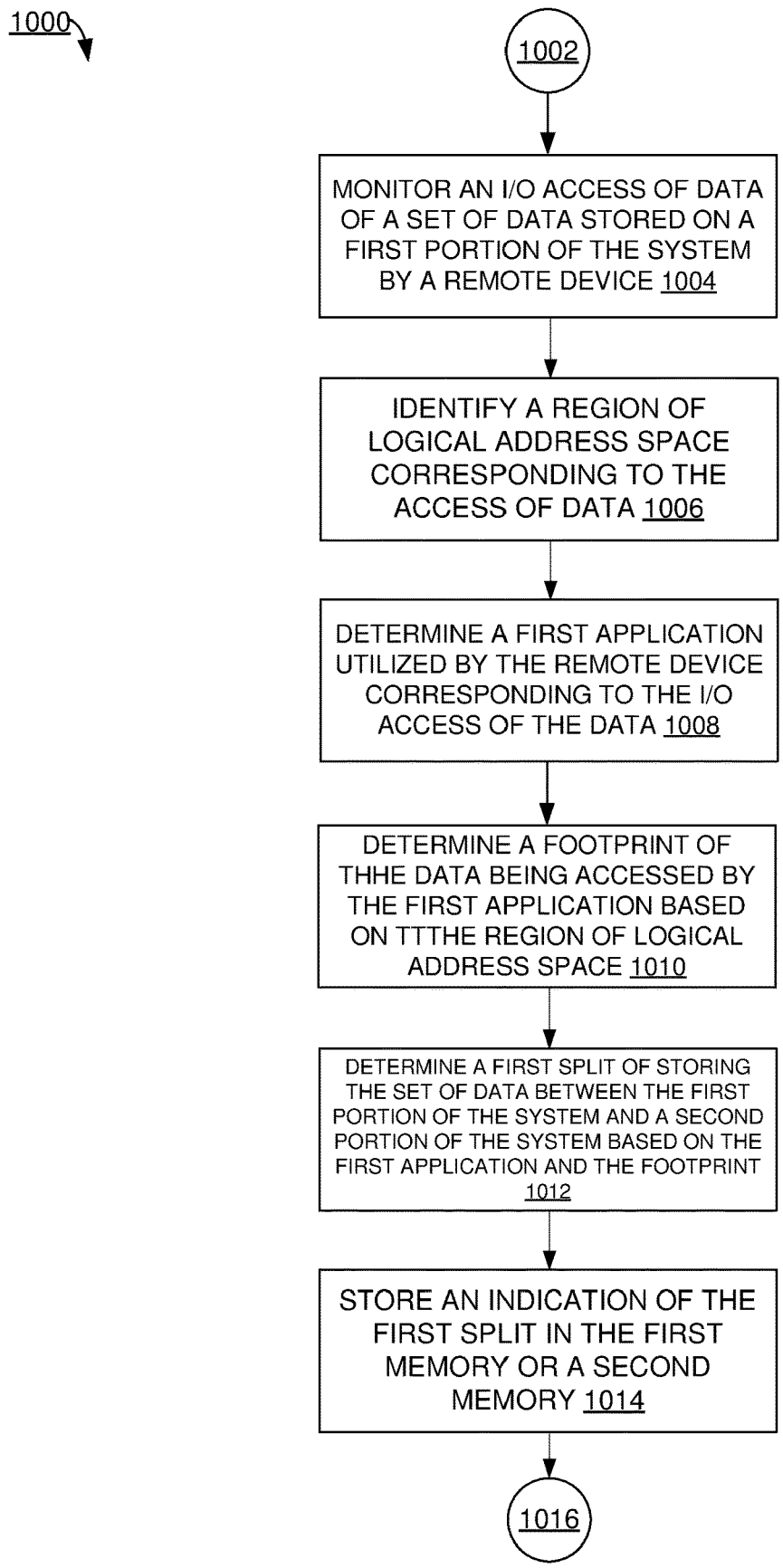
FIG. 10 illustrates another example process flow for determining a split for a dataset, in accordance with certain embodiments of this disclosure.

FIG. 10 illustrates another example process flow 1000 for determining a split for a dataset, in accordance with certain embodiments of this disclosure.

It can be appreciated that process flow 1000 is an example process flow, and that there can be embodiments that implement more or fewer operations than are depicted in process flow 1000, or that implement the operations of process flow 1000 in a different order than is depicted in process flow 1000.

In some embodiments, aspects of process flow 1000 can be implemented with computer storage 104 and/or dataset split management component 110 of FIG. 1. Process flow 1000 begins with 1002, and then moves to operation 1004.

Operation 1004 depicts monitoring an I/O access of data of a set of data stored on a first portion of the system by a remote device. In some examples, where operations 1004 and 1008 are implemented together, operation 1004 comprises determining a first application utilized by a remote device corresponding to an I/O access of a data of a set of data stored on a first portion of the system by a remote device. In some examples, operation 1004 comprises determining a first application utilized by a remote computer corresponding to access of a data of a set of data stored on a first portion of the system. For example, computer storage 104 of FIG. 1 can monitor I/O access of data of a set of data stored on computer storage 104 by computer host 102.

In some examples, the I/O access of the data comprises an indication of a first amount of reads from the data and a second amount of writes to the data. That is, the I/O access of data can comprise a read/write split. In some examples, the I/O access of the data comprises an indication of a first amount of random accesses of the data and a second amount of sequential accesses of the data. That is, the I/O access of data can comprise a random/sequential split. In some examples, the I/O access of the data comprises an indication of a block size of a storage object used to store the data.

After operation 1004, process flow 1000 moves to operation 1006.

Operation 1006 depicts identifying a region of logical address space corresponding to the access of the data. In some examples, where operations 1006 and 1010 are combined, operation 1006 comprises determining a footprint of the data being accessed by the first application based on a region of logical address space corresponding to the access of data. The logical address space may be a logical address space utilized by a computer host (e.g., computer host 102 of FIG. 1) to address storage offered by computer storage 104. In some examples, the regional of logical address space is not a contiguous region, but comprises multiple separate portions of the logical address space.

After operation 1006, process flow 1000 moves to operation 1008.

Operation 1008 depicts determining a first application utilized by the remote device corresponding to the I/O access of the data. In some examples, a computer application that executes on computer host 102 of FIG. 1 initiates the data access. In some examples, dataset split management component 110 of FIG. 1 can determine the first application.

In such examples, dataset split management component 110 can receive information about the I/O access of the data from computer storage 104. Dataset split management component 110 can also maintain an association between various I/O access patterns and corresponding applications that generate those I/O access patterns in a computer memory. Dataset split management component 110 can compare the I/O access received from computer storage 104 with these stored associations of I/O access patterns and corresponding applications to determine an I/O access pattern (and, thus, an application) that matches the I/O access received from computer storage 104.

In some examples, comparing the I/O to known I/O patterns for applications is expressed as determining that the I/O access of the data has a predefined level of similarity with a sample I/O access of a group of sample I/O accesses, the sample I/O access corresponding to the first application.

In some examples, determining the first application utilized by the remote device comprises determining a second application utilized by the remote device corresponding to the I/O access of the data. That is, the I/O can be generated by multiple applications of a computer host (e.g., computer host 102 of FIG. 1).

After operation 1008, process flow 1000 moves to operation 1010.

Operation 1010 depicts determining a footprint of the data being accessed by the first application based on the region of logical address space. In some examples, the footprint (sometimes referred to as a workset footprint) can be the data referred to by the logical address space accessed. In some examples, the logical address space accessed within a given predetermined time period (e.g., the past hour) can be considered in determining the footprint of the data being accessed by the first application.

After operation 1010, process flow 1000 moves to operation 1012.

Operation 1012 depicts determining a first split of storing the set of data between the first portion of the system and a second portion of the system based on the first application and the footprint. This first split can comprise storing hot data in a low-latency storage (e.g., storage location 1 106 of FIG. 1), and storing cold data in a higher-latency storage (e.g., storage location 2 108).

In some examples, operation 1012 comprises determining the first split based on a latency associated with accessing the set of data by the remote device. That is, latency can be considered in determining how to split the data.

In some examples, operation 1012 comprises determining a second split of storing the set of data between the first portion of the system and a second portion of the system based on the first application and the footprint. That is, a split can change over time, such as where I/O access patterns change over time.

In some examples, operation 1012 comprises, at the second time, storing the set of data according to the second split. That is, data can be moved between storage locations over time where the split changes over time.

In some examples, determining the second split comprises determining that the first split corresponds to a first footprint, and that the second split corresponds to a second footprint. That is, a split can change over time where a workset footprint of a dataset changes over time.

In some examples, operation 1012 comprises determining a second split of storing the set of data between the first portion of the system and a second portion of the system based on known I/O activity associated with the first application. That is, in some examples, a prediction can be made about how the split will change over time based on the application being used.

In some examples, operation 1012 comprises determining a second split of storing the set of data between the first portion of the system and a second portion of the system based on observed user behavior associated with the remote device. That is, in some examples, a prediction can be made about how the split will change over time based on observed user behavior. This observed user behavior can relate to how a user is using an application to generate I/O to computer storage.

In some examples, operation 1012 comprises determining a second split of storing the set of data between the first portion of the system and a second portion of the system based on performing machine learning on the remote device or a second device. That is, a predication can be made to how a split will change over time based on using machine learning techniques.

In some examples, the footprint is associated with a type of activity, and operation 1012 comprises determining the first split based on the type of activity. In some examples, the type of activity comprises at least one from a set, the set comprising no activity, ingesting the data, and processing the data. No activity can generally comprise a period of little-to-no I/O access of a dataset. Ingesting data can generally comprise a period where data is written to a dataset. Processing data can generally comprise a period where data is read from a dataset, and, possibly processed data is written back to the dataset.

After operation 1012, process flow 1000 moves to operation 1014.

Operation 1014 depicts storing an indication of the first split in the first memory or in a second memory. In some examples, operation 1014 comprises storing an indication of the first split in a memory. After a split has been determined, this result can be stored in a computer memory, and, optionally, other actions can be taken regarding the split, such as implementing the split on the dataset.

In some examples, operation 1014 comprises notifying a first user associated with the remote computer of the first split. Notifying the first user can comprise presenting a notification of the recommended first split in a user interface accessible to the first user. In some examples, notifying the first user comprises providing a recommended configuration to the first user. This recommended configuration can comprise the split of the dataset.

In some examples, operation 1014 comprises storing the set of data between the first portion of the system and the second portion of the system in accordance with the first split. That is, in some examples, the split can be automatically applied to the dataset without manual intervention by a user.

After operation 1014, process flow 1000 moves to 1016, where process flow 1000 ends.

Example Operating Environment

Figure 11:
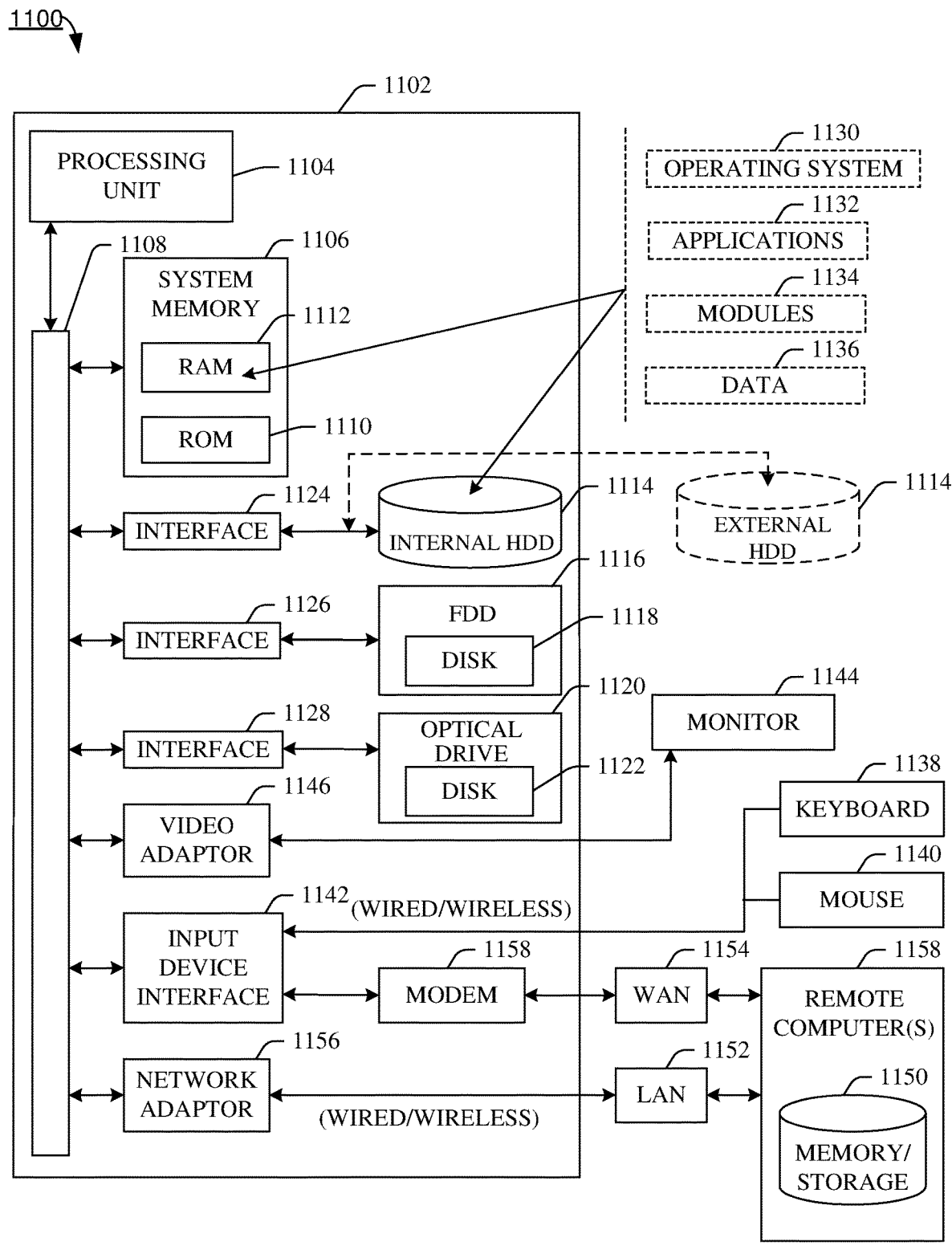
FIG. 11 illustrates an example block diagram of a computer operable to execute certain embodiments of this disclosure.

To provide further context for various aspects of the subject specification, FIG. 11 illustrates a block diagram of a computer 1102 operable to execute the disclosed storage architecture in accordance with aspects described herein. For example, aspects of computer 1102 can be used to implement aspects of computer host 102, computer storage 104, and/or dataset split management component 110 of FIG. 1, and/or storage location 1 206 and/or storage location 2 208 of FIG. 2. In some examples, computer 1102 can implement aspects of the operating procedures of FIGS. 3-10 to provide for a type-based message bus with message type hierarchies for non-object oriented applications.

FIG. 11 illustrates a block diagram of a computer 1102 operable to execute the disclosed communication architecture. To provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 11, the example environment 1100 for implementing various aspects of the specification includes a computer 1102, the computer 1102 including a processing unit 1104, a system memory 1106 and a system bus 1108. As an example, the component(s), server(s), node(s), cluster(s), system(s), and/or device(s) disclosed herein can each include at least a portion of the computer 1102. The system bus 1108 can couple system components including, but not limited to, the system memory 1106 to the processing unit 1104. The processing unit 1104 can be any of various commercially-available or custom processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 can include ROM 1110 and RAM 1112. A basic input/output system (BIOS) can be stored in a non-volatile memory 1110 such as ROM, erasable programmable read-only memory (EPROM), EEPROM, where the BIOS can contain the basic routines that help to transfer information between elements within the computer 1102, such as during startup. The RAM 1112 can also include a high-speed RAM such as static RAM for caching data, or NVRAM.

The computer 1102 further includes an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disc drive 1120, (e.g., reading a CD-ROM disc 1122 or, to read from or write to other high capacity optical media such as the DVD). The hard disk drive 1114, magnetic disk drive 1116 and optical disc drive 1120 can be connected to the system bus 1108 by a hard disk drive interface 1124, a magnetic disk drive interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the subject disclosure.

The drives and their associated computer-readable storage media can provide nonvolatile storage of data, data structures, computer-executable instructions, and so forth. For the computer 1102, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired or wireless input devices, e.g., a keyboard 1138 and/or a pointing device, such as a mouse 1140 or a touch screen or touchpad (not illustrated). These and other input devices can be connected to the processing unit 1104 through an input device interface 1142 that is coupled to the system bus 1108, but can be connected by other interfaces, such as a parallel port, an IEEE 1194 port, a game port, a USB port, an infrared (IR) interface, etc. A monitor 1144 or other type of display device can also be connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and can include many or all the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, can be connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 9 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a first memory that stores executable instructions that, when executed by the processor, facilitate performance of operations, comprising:
monitoring an input/output access of data of a set of data stored on a first portion of the system by a remote device;
identifying a region of logical address space corresponding to the input/output access of the data within a defined past time period;
identifying a first application operating on the remote device that performs the input/output access of the data based on analyzing the input/output access of the data, the input/output access of the data being received by the system from the remote device via a communications network, wherein the first application is one of a group of applications configured to operate on the remote device and to make input/output accesses of the system, wherein performing the analyzing of the input/output access of the data comprises performing the analyzing independently of an identifier of the first application, and further comprises determining a rate of the input/output access of the data, a ratio of reads to writes of the data, or a ratio of random accesses to sequential accesses of the data
determining a footprint of the data being accessed by the first application based on the region of logical address space;
comparing a stored input/output access pattern to an observed input/output access pattern of the first application executed by the remote device to determine that the first application corresponds to the set of data stored on the first portion of the system;
determining a first split of storing the set of data between the first portion of the system and a second portion of the system based on the performing of the identifying of the first application and the footprint; and
storing an indication of the first split in the first memory or in a second memory.

2. The system of claim 1, wherein performing the analyzing of the input/output access of the data further comprises determining a first amount of reads from the data and a second amount of writes to the data.

3. The system of claim 1, wherein performing the analyzing of the input/output access of the data further comprises:
determining a first amount of random accesses of the data in the input/output access of the data; and
determining a second amount of sequential accesses of the data in the input/output access of the data.

4. The system of claim 1, wherein performing the analyzing of the input/output access of the data further comprises:
determining a block size of a storage object used to store the data.

5. The system of claim 1, wherein performing analyzing of the input/output access of the data comprises:
determining that the input/output access of the data has a predefined level of similarity with a sample input/output access of a group of sample input/output accesses, the sample input/output access corresponding to the first application.

6. The system of claim 1, wherein the operations further comprise:
determining a second application of the group of applications that is utilized by the remote device corresponding to the input/output access of the data.

7. The system of claim 1, wherein the determining the first split of storing the set of data between the first portion of the system and the second portion of the system based comprises:
determining the first split based on a latency associated with accessing the set of data by the remote device.

8. A method, comprising:
identifying, by a system comprising a processor, a first application that operates on a remote device that performs an input/output access of a data of a set of data stored on a first portion of the system by the remote device based on analyzing the input/output access of the data, the input/output access of the data being received by the system from the remote device via a communications network, wherein performing the analyzing of the input/output access of the data comprises determining a rate of the input/output access of the data, a ratio of reads to writes of the data, or a ratio of random accesses to sequential accesses of the data;
determining, by the system, a footprint of the data being accessed by the first application based on a region of logical address space corresponding to the input/output access of the data within a defined past time period;
comparing, by the system, a stored input/output access pattern to a determined input/output access pattern of the first application executing via the remote device to determine that the first application corresponds to the data of the set of data stored on the first portion of the system;
determining, by the system, a first split of storing the set of data between the first portion of the system and a second portion of the system based on the performing of the identifying of the first application and the footprint; and
storing, by the system, an indication of the first split in a memory.

9. The method of claim 8, wherein the first split corresponds to a first time, and further comprising:
determining, by the system, a second split of storing the set of data at a second time between the first portion of the system and the second portion of the system based on the first application and the footprint, the first time differing from the second time.

10. The method of claim 9, further comprising:
at the second time, storing, by the system, the set of data according to the second split.

11. The method of claim 9, wherein the determining the second split comprises:
determining, by the system, that the first split corresponds to a first footprint, and that the second split corresponds to a second footprint.

12. The method of claim 8, further comprising:
determining, by the system, a second split of storing the set of data between the first portion of the system and the second portion of the system based on known input/output activity associated with the first application.

13. The method of claim 8, further comprising:
determining, by the system, a second split of storing the set of data between the first portion of the system and the second portion of the system based on observed user behavior associated with the remote device, the observed user behavior relating to how a user is using the first application to generate the input/output access.

14. The method of claim 8, further comprising:
determining, by the system, a second split of storing the set of data between the first portion of the system and the second portion of the system based on performing machine learning on the remote device or a second device.

15. A non-transitory computer-readable medium comprising instructions that, in response to execution, cause a system comprising a processor to perform operations, comprising:
identifying a first application that operates on a remote computer and that corresponds to access of a data of a set of data stored on a first portion of the system based on analyzing the access of the data, the access of the data being received by the system from the remote computer via a communications network, wherein performing the analyzing of the access of the data comprises determining a rate of access of the data, a ratio of reads to writes of the data, or a ratio of random accesses to sequential accesses of the data;
determining a footprint of the data being accessed by the first application based on a region of logical address space corresponding to the access of the data within a defined past time period;
comparing a stored input/output access pattern to an input/output access pattern exhibited by the first application operating on the remote device to determine that the first application corresponds to the data of the set of data stored on the first portion of the system;
determining a first split of storing the set of data between the first portion of the system and a second portion of the system based on the performing of the identifying of the first application and the footprint; and
storing, by the system an indication of the first split in a memory.

16. The non-transitory computer-readable medium of claim 15, wherein the operations further comprise:
notifying a first user associated with the remote computer of the first split.

17. The non-transitory computer-readable medium of claim 16, wherein the notifying the first user comprises:
providing a recommended configuration to the first user.

18. The non-transitory computer-readable medium of claim 15, wherein the operations further comprise:
storing the set of data between the first portion of the system and the second portion of the system in accordance with the first split.

19. The non-transitory computer-readable medium of claim 15, wherein the footprint is associated with a type of activity, and wherein the operations further comprise:
determining the first split based on the type of activity.

20. The non-transitory computer-readable medium of claim 19, wherein the type of activity comprises at least one from a set, the set comprising no activity, ingesting the data, and processing the data.

* * * * *